United States Patent [19]

Harris et al.

[11] 4,259,716
[45] Mar. 31, 1981

[54] TRANSFORMER FOR USE IN A STATIC INVERTER

[75] Inventors: James E. Harris, Liverpool; Robert J. McFadyen, Syracuse; William Peil, N. Syracuse; Nicholas A. Schmitz, Liverpool, all of N.Y.

[73] Assignee: General Electric Company, Syracuse, N.Y.

[21] Appl. No.: 28,405

[22] Filed: Apr. 9, 1979

Related U.S. Application Data

[63] Continuation-in-part of Ser. No. 875,337, Feb. 6, 1978, abandoned.

[51] Int. Cl.³ .................... H01F 31/00; H02M 1/08
[52] U.S. Cl. .................... 363/97; 336/155; 336/172; 363/123
[58] Field of Search ............ 323/44 R; 336/20, 155, 336/172; 363/90, 97, 123

[56] References Cited

U.S. PATENT DOCUMENTS

| | | | |
|---|---|---|---|
| 2,284,406 | 5/1942 | D'Entremont | 336/172 X |
| 2,953,739 | 9/1960 | Duinker | 336/155 X |
| 3,629,741 | 12/1971 | Brune | 336/155 X |
| 4,002,999 | 1/1977 | Hesler | 363/123 X |
| 4,004,251 | 1/1977 | Hesler et al. | 336/172 X |
| 4,020,440 | 4/1977 | Moerman | 336/172 X |
| 4,202,031 | 5/1980 | Hesler et al. | 336/172 X |

FOREIGN PATENT DOCUMENTS

2306819 8/1974 Fed. Rep. of Germany.

OTHER PUBLICATIONS

Baldwin, "A Magnetic Device for High Speed Sensing of Small Currents," AIEE Transactions, Part I, vol. 80, 1961, pp. 1–3.

*Primary Examiner*—A. D. Pellinen
*Attorney, Agent, or Firm*—Richard V. Lang; Carl W. Baker

[57] ABSTRACT

A novel transformer is described for use in a static inverter in association with one or two switching semiconductor devices. The transformer produces an output for control of the associated switching device(s) which changes in sense from conduction aiding to conduction inhibiting as a function of the flux level in the transformer core. The invention is applicable to single loop cores, such as are assembled from two "U" cores. Control is effected by a primary and secondary control winding wound through an aperture pair, the aperture pair being oriented for "neutrality" of the second control winding to the main flux. The aperture pair creates a five branch magnetic path which permits optimizing the control voltage applied to the associated semiconductor devices both to enhance the switching efficiency when the switching device is initially turned on and to reduce stresses on the switching device by precluding transformer saturation when the switching device is turned off. With two switching devices, two aperture pairs are normally provided.

18 Claims, 11 Drawing Figures

TRANSFORMER FOR USE IN A STATIC INVERTER

This is a continuation-in-part of co-pending U.S. patent application Ser. No. 875,337, Feb. 6, 1978, now abandoned, entitled "A Static Inverter and a Transformer for Use in a Static Inverter" by Nicholas A. Schmitz, James E. Harris and William Peil.

BACKGROUND OF THE INVENTION

1. Field of the Invention

The invention relates to transformers for use in static inverters. Static inverters are devices in which electrical energy in the dc form is converted to electrical energy in the ac form through static means. The present invention lies in the class of inverters in which the dc source produces a current through one or two semiconductor devices, each connected in series with a primary winding of a power transformer and producing an ac output in a transformer secondary winding as the semiconductor devices are switched. The transformers as described herein are adapted for use in inverters using one or two transistor configurations, and include control windings, which are coupled to an input electrode of the semiconductor device to effect efficient and stress free switching.

2. Description of the Prior Art

Static inverters of the class employing a dc source, one or two switching semiconductor devices and a transformer are well known. The arrangements may exist in either free running or the driven form. Representative static inverters are illustrated in U.S. application Ser. No. 956,578 of Hesler et al, now U.S. Pat. No. 4,202,031, assigned to the assignee of the present invention. In either free running or driven form, feedback windings may be used to effect switching of the semiconductor devices. Recently, as represented by U.S. Pat. No. 3,914,680 and U.S. Pat. No. 4,002,999 to Hesler et al and assigned to the Assignee of the present invention, the transformer properties have been tailored to the requirements of the semiconductor in the inverter application, in particular to maximise the switching efficiency and to avoid unduly stressing the semiconductor devices resulting from full core saturation. In both cited patents, the main core is provided with an aperture (or two, in the two transistor inverters), each of which divides the core into two localized branches. One branch is designed to saturate first, and upon saturation to reduce the regenerative and increase the degenerative feedback applied to the transistor, so as to prevent full core saturation. The patented circuits have led to a reduction in cost of such inverters, and a substantial improvement in the switching efficiencies. The present invention represents a further improvement of such arrangements.

SUMMARY OF THE INVENTION

Accordingly, it is an object of the present invention to provide an improved transformer for use in a static inverter.

It is a further object of the present invention to provide a novel transformer for use in a static inverter in which full core saturation and the accompanying stresses on the associated semiconductor devices are avoided.

It is still another object of the present invention to provide a novel transformer for use in a static inverter in which the efficiency of the associated switching semiconductor devices is improved and circuit losses are reduced.

It is an additional object of the present invention to provide a novel transformer for use in a static inverter in which a control output is produced for application to a switching device which changes in sense as a function of the flux level in the transformer core.

It is still another object of the present invention to provide a novel inverter subcombination comprising a transformer and a junction transistor switching device interconnected to facilitate an optimum transistor conduction control, which changes in sense as a function of the flux level in the transformer core and improves both inverter efficiency and reliability.

These and other objects of the invention are achieved in a transformer having a core of substantially linear magnetic material having a closed magnetic path to which a pair of apertures are formed in a localized region of the core. One aperture divides a magnetic path into a first and second branch, and the second aperture divides the magnetic path into a third and fourth branch with a fifth branch being formed between the apertures. The first and fourth branches form a "first" diagonal pair of branches and the second and third branches form a "second" diagonal pair of branches. The apertures are serially arranged along the magnetic path to prevent the main flux from flowing into the fifth branch and to place the fifth branch "orthogonal" to the main flux.

A primary winding is provided encircling the full magnetic path for generating a main flux in the core when current is supplied thereto. A first control winding is provided encircling the fifth branch for generating a circulating flux when current is supplied to it forming two counter-rotating loops around the apertures. The fluxes in the two loops combine additively in the fifth branch, with the flux in a loop combining additively with the main flux in one diagonal pair of branches and substractively in the other diagonal pair of branches. A second control winding is provided encircling the fifth branch.

The second control winding derives an electrical quantity whose sign reverses as a function of the magnetic state of the core.

In the magnetic design, the products of the reluctances of the first diagonal pair of branches should be set equal to the products of the reluctances of the second diagonal pair of branches to reduce the tendency of the main flux to be coupled to the second control winding. In addition, the reluctances of the first and second branches may be set equal, a more restrictive design setting which further improves "neutrality" to main flux with nonlinear ferrites.

In a practical case, where three levels of control are sought, the reluctances of the first and second branches are set to be greater than the reluctances of the third and fourth branches, predisposing the first branch to saturate first and the fourth branch to saturate second. This is normally achieved by making one aperture larger than the other, and insuring that the reluctance of the fifth branch is less than that of the other branches to preclude its saturation prior to the first and fourth branches.

Preferably, the first and second control windings are of a few turns and are closely coupled in the absence of selective saturation to achieve substantial current transformer action. The magnetic design produces a maximum core coupling between the first and second control windings in the absence of saturation, the coupling being reduced as each branch saturates.

In an inverter, means are provided for supplying substantially synchronous alternating currents to the primary transformer winding and to the first control winding to insure that the main and circulating fluxes add in the first diagonal pair of branches and subtract in the second diagonal pair, and force the first diagonal pair of branches to saturate first as supplied current increases.

When a resistive load is coupled to the second control winding, saturation of the first diagonal pair of branches tends to force main flux into the fifth branch. This causes a reversal in the direction of the flux coupled to the second control winding and a reversal in polarity of the electrical control quantity coupled to the resistive load.

When the load coupled to the second control winding is the input junction of a junction transistor, the mechanism of reduction and reversal in the control output involves the repeated increase in the reluctance of the current transformer formed by the first and second control windings.

Typically, the junction transistor is the switching device for supplying alternating current to the primary winding and to the first control winding and the device exhibits appreciable stored charge. When the second winding is coupled across the input junction of the transistor, current transformer action from the first control winding tends to apply a conduction aiding base current to the transistor at the onset of conduction. A property of the connection of the input junction across the second control winding is that a constant voltage drop is sustained across the second control winding so long as the transistor remains conductive. This fixed voltage in turn imposes a constant rate of change of flux on the magnetic region (the fifth branch particularly) to which the second control winding is coupled. Accordingly, when the one branch (the first) saturates, assuming unequal apertures, the reluctances coupling the first and second control windings together is increased appreciably and reduces the rate of increase of applied base current. When the next branch (the fourth) saturates, the reluctance is increased so substantially that both a slope reversal and an absolute current reversal is produced. The reversal in current drive continues until storage charge is removed from the switching device and its conduction terminated.

The arrangement described herein achieves high efficiency switching through the provision of a strong regenerative drive during the initial conduction interval followed by an optimum transition to the OFF state with controlled reversal of current drive. The timing and rate of reversal can be adjusted to prevent full core saturation and the resultant stressing of the transistor.

The arrangement is applicable to inverters using one or two switching devices. With two switching devices, two aperture pairs may be used.

BRIEF DESCRIPTION OF THE DRAWING

The novel and distinctive features of the invention are set forth in the claims appended to the present application. The invention itself, however, together with further objects and advantages thereof may best be understood by reference to the following description and accompanying drawings, in which:

DESCRIPTION OF THE PREFERRED EMBODIMENT

Figure 1:
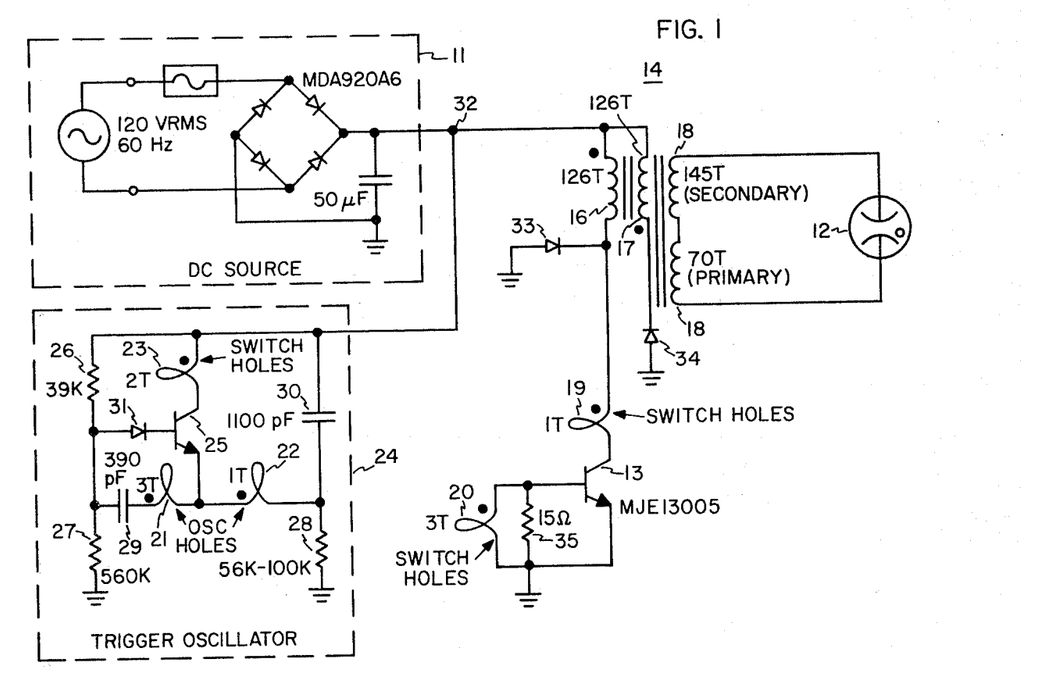
FIG. 1 is an electrical circuit diagram of a static inverter employing a novel power transformer having control windings which in response to the magnetic state of the core provide successive conduction aiding and conduction inhibiting feedback.

Referring now to FIG. 1, a dc to ac inverter employing a novel transformer is shown for converting electrical energy supplied from a 155 V dc source 11 to a load at 200 volts at approximately 25 kilohertz. The ac load may be a high efficiency gas discharge lamp as illustrated at 12. The inverter comprises a power transistor 13, the novel power transformer 14, sundry circuit elements 33, 34, 35 associated with transistor 13 and a trigger oscillator 24, the combination (less 24) functioning as a forward converter in which energy during the off state of the switching transistor is returned to the dc source 11.

Figure 2:
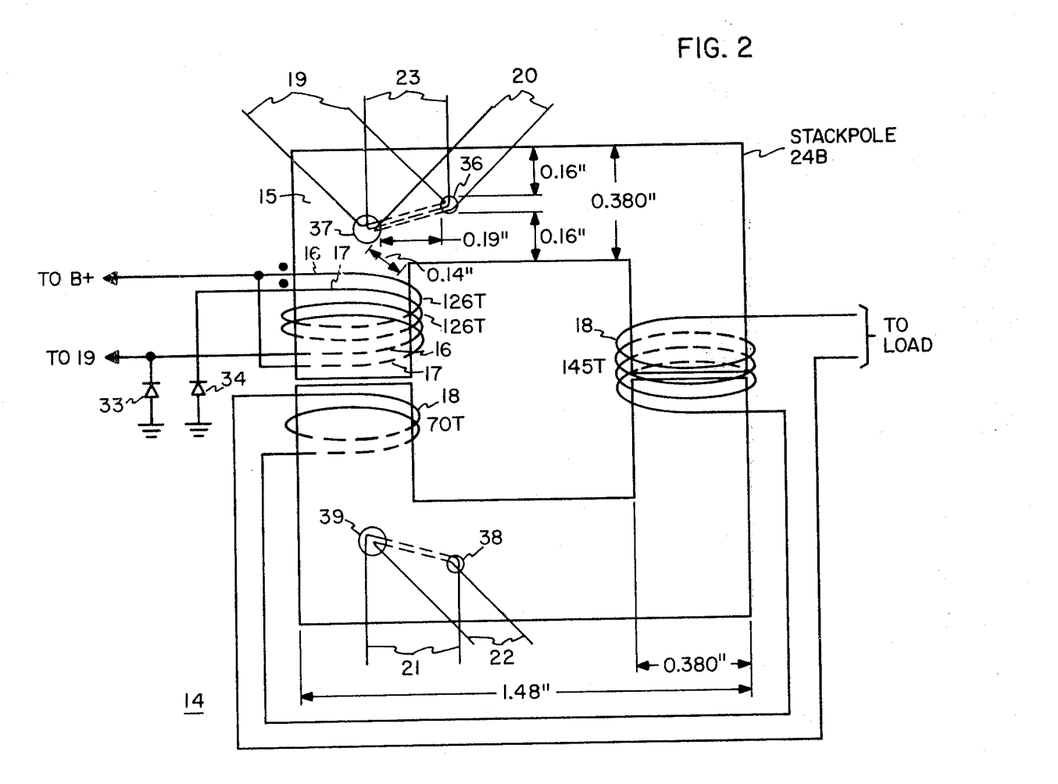
FIG. 2 is a drawing illustrating the construction of the novel transformer including a core having unique aperture pairs and the windings associated with the core and the aperture pairs.

The novel power transformer 14, illustrated in greater detail in FIG. 2, has a single rectangular loop core 15, a primary winding 16, a forward conversion winding 17, and a secondary winding 18, all coupled about the full core cross section. The 126 turn primary winding 16 and the 126 turn forward conversion winding 17 are bifilarly wound about the left leg of the core for close coupling as illustrated in FIG. 2. In addition, 70 turns of the 215 turn secondary winding are wound on the left leg of the core for increased coupling to the primary, the 145 turn remainder being wound around the right leg of the core. The power transformer also has a primary 19 and a secondary 20 control winding for connection to the power transistor 13. These control windings are led through a first double aperture (36,37), which as will be explained, produce a mutual coupling dependent upon flux levels in the core. A second double aperture (38, 39) with which windings 21 and 22 are associated is provided for operation of the trigger oscillator 24. The trigger oscillator output appears at a third control winding 23 wound through the first double aperture (36, 37) for coupling to the power transistor input, as will be described in greater detail hereinafter.

The transistor inverter employs the transformer 14 and the switching transistor 13 in a triggered forward converter configuration. The switching transistor is turned on by a trigger oscillator 24 timed to produce a pulse at a 25 KHz repetition rate, and the magnetics determine the shape of the conduction waveform and the length of the conduction pulse. To achieve that control, the control windings initially provide a regenerative or conduction aiding drive followed by a degenerative or conduction inhibiting drive which effects transistor turn off.

The trigger oscillator 24, which is not in itself a part of the present invention, is similar to that described in U.S. application Ser. No. 974,253, filed Dec. 28, 1978 by William Peil, entitled "A Pulse Generator Producing Short Duration High Current Pulses for Application to a Low Impedance Load" and assigned to the Assignee of the present application. The trigger oscillator, which utilizes the magnetic structure of the power transformer 14 as noted earlier, comprises the transistor 25, resistors 26, 27, 28, capacitors 29, 30, the diode 31 and the transformer windings 21, 22 associated with aperture pair 38, 39 and winding 23 associated with aperture pair 36, 37.

The trigger oscillator 24 is a relaxation oscillator having magnetically coupled regenerative feedback essential to the production of a high intensity short duration trigger pulse and a biasing configuration which makes the pulse repetition rate insensitive to variations in the dc supply voltage or load.

The trigger oscillator consists of an NPN transistor 25 having its collector electrode connected through the trigger output winding 23 to the positive terminal 32 of the dc source and its base electrode connected through a protective diode 31 to a voltage divider consisting of the resistances 26 and 27 connected in the order recited between the B+ terminal 32 and ground. The emitter of transistor 25 is connected to ground through the serially connected primary feedback winding 22 and the resistance 28. A capacitor 30 is provided coupled between the ungrounded terminal of the resistance 28 and the B+ terminal 32. Secondary feedback winding 21 is coupled by capacitance 29 across the serially connected diode 31 and the input junction of transistor 25. The diode 31 and transistor input junction are connected in like polarity.

The trigger oscillator functions as a relaxation oscillator with the capacitor 30 being recurrently charged through the resistor 28 and recurrently discharged through transistor 25. In the charge-discharge process, the voltage on the lower terminal of the capacitor falls slowly from near B+ to a value of typically 15-40 volts below B+ at a discharge rate established by resistor 28, the size of the capacitor and the B+ potential. At the desired minimum voltage, the transistor becomes conductive, arresting the downward discharge. Current flow through the transistor 25 occurs between the upper B+ connected capacitor terminal and the other, lower capacitor terminal, transistor conduction bringing the lower capacitor terminal to a potential slightly (i.e. 2 volts) below B+. When the discharge stops with the transistor input junction strongly back-biased, the charging through resistance 28 repeats.

The charging of the capacitor is arrested when the transistor 25 becomes conductive at a voltage set by the base connected voltage divider. The emitter electrode, which is connected through the low impedance winding 22 to the lower capacitor terminal, follows the potential of the lower capacitor terminal as it falls. The base electrode of transistor 25, however, which is connected through diode 31 to the voltage divider 26, 27 connected across the dc source, is maintained at an arbitrary fraction of the B+ potential (about 15-40 volts below B+). Thus, the transistor input junction varies from a strong (15-40 volts) backward bias precluding conduction when the capacitor begins to charge, to a forward bias causing the transistor to become conductive again. Transistor conduction halts the charging process with an abrupt discharge of the capacitor. Transistor conduction begins when the lower terminal of the capacitor 30 is approximately two diode drops below the voltage of the base connected tap on the voltage divider.

The transistor turn on mechanism is affected by the parasitics of the transistor and the shunting effect of the low impedance feedback windings. At near zero base current, the base impedance is high and the transistor ac gain is low, attributable to a dc $\beta$ roll off, and to a very low high frequency cut-off due to parasitic capacity shunting the input and output terminals. Thus, the initial onset of base current conduction will not produce a greater than unity current gain condition. As the base current continues to increase, however, the base input impedance will fall and the high frequency cut off will increase, providing increasing ac gain. When the output current reaches a value where the shunting effect of the low inductive reactances of the primary and secondary feedback windings no longer keep the circuit gain below unity, effective regenerative action will occur.

With effective regeneration provided by the feedback windings 21, 22, full transistor conduction takes place very quickly. Current flows through the winding 23, the transistor 25, and the winding 22 in a closed path carrying current from the upper to the lower terminal of the capacitor 30. The current flowing in the primary feedback winding 22 induces a regeneratively sensed base drive in the secondary feedback winding 21 magnetically coupled to the core through apertures 38, 39. The feedback causes a very sudden increase in current in the transistor, permitting the capacitor to discharge quickly. The discharge through output winding 23 wound through aperture pair 36, 37 induces a pulse of from 0.5 to 1 ampere having a duration of approximately 200 nanoseconds in the second control winding 20 of the main switching transistor 13 turning it on and starting the conduction cycle. In the example, the pulse repetition rate is 25 KHz.

The aperture pair 38, 39 by means of which the feedback windings 21 and 22 are inductively coupled, is positioned in the core for neutrality to the main flux in the same manner as the aperture pair 36, 37 used for control of the switching transistor 13. The trigger pulse is generated by the trigger oscillator at a time when the switching transistor 13 is quiescent. Conversely, once the switching transistor is conducting, the trigger oscillator is quiescent. Both factors reduce the chance for adverse interaction. The magnetic isolation attributable to the geometry between the main flux and the trigger oscillator feedback windings 21 and 22 is generally sufficient for isolation throughout the switching cycle.

The trigger oscillator described has a repetition rate which is substantially independent of variations in source voltage or in loading.

The forward converter is not in itself a part of the present invention, and is similar to that described in U.S. application Ser. No. 956,578 filed Nov. 1, 1978, now U.S. Pat. No. 4,202,031, and assigned to the assignee of the present application.

The triggered forward converter consists of the switching transistor 13, the power transformer 14, including windings 16–20, 23, diodes 33, 34 and resistance 35. These components are interconnected as follows. The primary power winding 16 and the primary control winding 19 are serially connected between the B+ terminal 32 and the collector of transistor 13. The emitter of transistor 13 is connected to ground. A secondary control winding 20 is coupled between base and emitter of transistor 13, with a resistance 35 connected in shunt with the input junction to prevent free running. A decommutating diode 33 is coupled between the connection of windings 16 and 19 and ground in a polarity to reduce charge storage in the transistor 13 during current reversal. The forward conversion winding 17, closely coupled to the primary winding 16, has its undotted terminal coupled to B+ terminal 32 and its dotted terminal coupled through diode 34 to ground. Diode 34 is poled to re-inject energy stored in the magnetics into the power supply during transistor turn off, a feature which also reduces stresses on the transistor. The secondary winding 18 of which 70 turns are closely coupled to the primary winding, drives the load 12, providing a 200 V p to p voltage for a gas discharge lamp load at approximately 25 KHz. The control windings 23, 19 and 20 supply the initial ignition pulse to the switching transistor, and supply an optimized drive to the transistor input electrodes in accordance with the invention.

The forward converter operates in the following manner. The switching transistor 13 is initially turned on by a high current short duration pulse inductively coupled from the output winding 23 of the trigger oscillator to the winding 20, coupled to the base of transistor 13. The pulse causes the transistor 13 to start to conduct with collector current flowing in the primary feedback winding 19. Once started, the collector current waveform increases in a substantially linear upward ramp. The ramp extends through the conduction interval at a slope determined by the primary inductance of the transformer 14. After the triggering instant, the base current induced in winding 20 first sustains transistor conduction, and then reversing, terminates transistor conduction. Intermittent conduction by the switching transistor 13 causes an alternating current in the primary winding 16 of the power transformer, inducing the alternating voltage in the secondary winding 18 suitable for operation of the load 12.

Figure 5:
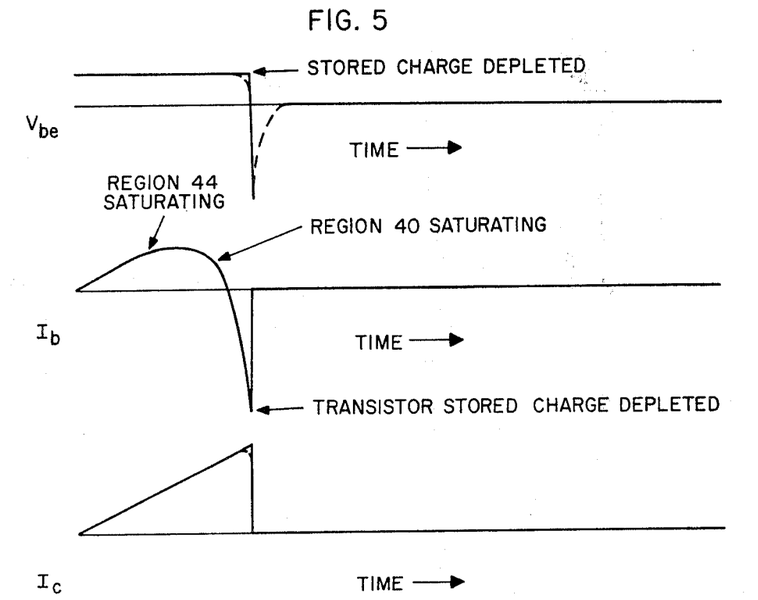
FIG. 5 are three idealized waveshapes predicted by the analysis and representative of the device operation.

Waveforms useful to understanding the operation of the forward converter are illustrated in FIG. 5. The output voltage of the inverter (not shown) is a substantially rectangular waveform of slightly under 200 V peak to peak (under no load) at a 25 KHz repetition rate. The amplitude and shape of the waveform is strongly dependent upon the load and is normally of lesser amplitude and lesser rectangularity in the loaded condition. The collector current waveform is the lowermost waveform of FIG. 5. As indicated above, it is a linear ramp during the conduction interval, falling sharply and remaining at a zero value until the next conduction interval. The base current waveform, second from the bottom in FIG. 5, illustrates the desired initial steep current increase, the less steep portion, followed by slope reversal, and then drive reversal which terminates transistor conduction. The base emitter voltage is the uppermost waveform in FIG. 5. Throughout transistor conduction, the base-emitter voltage ($V_{be}$) holds at a nearly fixed forward value (+0.7 volts). At the instant of collector current collapse (after stored charge removal), the base voltage goes strongly negative, and then returns to zero until the next trigger pulse.

The base drive waveform ($I_b$) illustrated in FIG. 5 and supplemented by charge stored from the trigger pulse, sustains transistor conduction immediately after the termination of the trigger pulse. Later in the cycle, the waveform exhibits a current feedback characteristic particularly desirable when one wishes to turn off a power transistor in a typical inverter circuit. The characteristic permits one to turn the transistor off at the end of each conduction cycle in advance of full saturation of the inverter transformer. Should saturation not be prevented, the inductive impedance in the transistor load will fall sharply, applying the full B+ potential across the transistor and subjecting it to very high current stresses. In addition to preventing turn off stresses, the base drive should be made strongly regenerative at the initial portion of the cycle in the interests of optimum switching efficiency.

In accordance with the invention, the optimized base drive just described is achieved by means of the control windings 19, 20 and 23 associated with apertures 36 and 37 in the transformer core.

FIG. 2, which shows the ferrite core 15, the disposition of the power windings and the control windings also illustrates exemplary core dimensions. As earlier indicated, the primary winding 16, the forward conversion winding 17 and 70 turns of the secondary winding 18 embrace the left leg of the full core cross section with the remainder of the secondary winding 18 being wound on the right leg. The upper, lower, right, and left legs have a 0.38"×0.38" square cross section. The core has outside dimensions of approximately $1\frac{1}{2}$"×$1\frac{1}{2}$"×0.38" and it is assembled from two "U" cores with a 0.020" air gap at the joints. The aperture pair 36, 37, with which the control windings 19, 20 and 23 are associated is disposed in a region in the upper left corner of the core while the aperture pair 38, 39 with which the windings 21, 22 are associated is similarly disposed in a region of the lower left corner of the core near the primary bobbin. In each case, the smaller aperture has a diameter of 0.06" and is disposed on the center line of its respective upper or lower leg, leaving a 0.160 margin above and below the aperture. The larger aperture, in each case, is 0.100" in diameter and is disposed along a diagonal line extending through the corners of the core. The distance between the large aperture and the inside corner of the core is 0.140" thus being 0.020" less than the 0.160" wall to wall spacing of the smaller aperture. The interaperture distance is 0.190", being selected to be larger than either the 0.16" or the 0.14" dimensions.

Figure 3A:
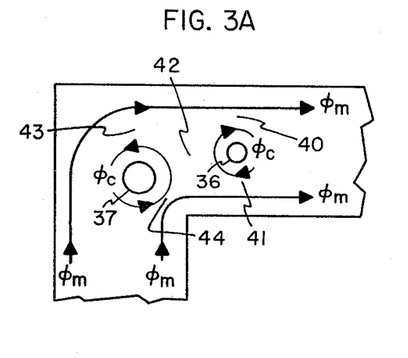
FIGS. 3A through 3D are explanatory diagrams of the magnetic state of the transformer core in the region of the aperture pair at successive stages in the transistor switching cycle.

The two apertures 36, 37 whose positions and dimensions have just been discussed divide the main flux path into five branches. These branches are illustrated in each of FIGS. 3A through 3D under differing magnetic states. As seen in FIG. 3A, the core portion above the small aperture 36 is assigned a reference numeral 40, while the portion beneath the aperture is assigned a reference numeral 41. The core portion between the outer extremity of the core and the large aperture 37 is assigned a reference numeral 43, while the portion between the inside corner of the core and the aperture 37 is assigned a reference numeral 44. The core portion between the apertures is assigned a reference numeral 42.

The overall objective of providing an optimized base drive waveform for the switching transistor which is first strongly conduction aiding and finally conduction inhibiting is achieved by several magnetic design features.

The first feature is that of orthogonality or "neutrality" in the disposition of the inter-aperture branch 42 and the associated second control winding with respect to main flux ($\phi_m$) flowing around the main flux path of the core. If one assumes that no main flux is flowing, and that the only flux is the circulating flux ($\phi_c$), generated by the primary feedback winding 19, one will find that the indicated disposition produces closely coupled current transformer action between the primary and secondary control windings 19 and 20. As the current in the collector winding increases, then a proportional increase will occur in the base connected winding, and if the windings 19 and 20 are properly sensed, a conduction aiding base current will be created, tending to be proportional to the turns ratio. In the present example, the collector winding is one turn and the base connected winding is of three turns, tending to force the base current above the natural beta determined current, and further enhancing the drive. "Neutrality" in the sense used here means that if one assumes that current flows in only the main windings 16 and 17 creating a flux ($\phi_m$) in the main flux path, that there will be substantially no drive induced in the secondary control winding 20.

The "neutrality" to main flux of the base winding, as just described, is achieved by orienting the two apertures (36, 37) downstream of one another in the main flux path so that no flux tends to flow into the inter-aperture region (42). Had the two apertures been located on a leg remote from the corners, the "neutral" position for the two apertures would be in a line approximately parallel to the center line of the leg (and normally on the center line). In practice, it is preferable to place the apertures in close proximity to the main power winding to reduce the time delays in the switching device. In addition, the larger aperture should be placed in the corner so that neither the total cross section of the core nor the strength of the core is reduced by its presence.

With the foregoing geometry and depending in part upon the nature of the load applied to the second control winding 20, it will respond only to the circulating flux generated by the control winding 19 and will not respond to the main flux ($\phi_m$) until the main flux has achieved quite high levels. More particularly, in the event that the load coupled to the control winding is the input junction of a transistor having appreciable stored charge, it has been found that any diversion of main flux into the inter-aperture branch (42) will be resisted until the transistor becomes non-conductive. In the event of a resistive load lacking energy storage, the inter-aperture branch 42 may still retain substantial neutrality to the main flux until one or two of the branches (40, 44) are saturated. The initial neutrality to main flux just described under both load conditions permits one to achieve an initially strong conduction aiding drive as a result of simple current transformer action between windings 19 and 20, uninterferred with by main flux.

A second feature in the magnetic design produces the reduction in forward drive and then reversal. This feature is the proper dimensioning of the cross sections of the five branches and thereby their reluctances, as set forth earlier. As will be shown, if one branch adjacent to the larger aperture (e.g. 44) is dimensioned to saturate first, and the branch adjacent the smaller aperture 36 (e.g. 40) is dimensioned to saturate next, the inter-aperture branch 42 normally being dimensioned not to saturate, and the diagonal reluctance products are equal ($R43 \times R41 = R40 \times R44$), then the desired reduction in drive and final drive reversal will occur (as will be explained below).

The desired reversal in drive may be achieved by one of two mechanisms dependent on the load coupled to the secondary control winding. In the case where the principal load to the winding 20 is the input junction of the switching transistor 13 which exhibits appreciable stored charge, base drive reduction and reversal may be produced by a change in the reluctance coupling the primary and secondary control windings 19, 20 as the branches 44 and 40 saturate. The presence of stored charge in the input junction, as will be explained, tends to sustain a constant rate of change of flux in the inter-aperture branch ($\phi$) until the charge is swept out. Under this condition, substantial neutrality to the main flux is sustained throughout the base drive cycle in spite of localized saturation.

In the event that the load coupled to the control winding 20 is a simple resistance, not having an energy storage property, then main flux may enter the inter-aperture branch 42 flowing from branch 43 to 41 as branches 44 and 40 become saturated, and produce a reversal in drive by a second flux steering mechanism. The new diagonal flow of the main flux induces a current in winding 20 in a sense reversed to that generated by the primary winding 19.

These matters will now be undertaken in greater detail with reference to FIGS. 3A through 3D.

FIG. 3A is a view of the initial flux conditions in the vicinity of the double aperture. Solid arrows depict the flux conditions a moment in normal operation after the trigger pulse, and transistor currents have begun to flow in the control windings 19 and 20. The main flux $\phi_m$ enters from below the corner of the core and exits to the right of the corner pursuing a clockwise course around the core above and below the aperture pair. In the vicinity of the apertures 36 and 37, a circulating flux ($\phi_c$) is created around each aperture as a result of current flowing in the control winding 19. The serially connected control winding 19 carries the same current that flows through primary winding 16, which generates the main flux $\phi_m$, fixing the phase relationships between $\phi_m$ and $\phi_c$. Typically, the circulating flux attributable to the control winding 19 is made counterclockwise around the aperture 37 and clockwise around the aperture 36 when the main flux has a clockwise sense around the main core.

The flux distribution near the apertures (36,37) may be regarded as resulting from a pair of magnetomotive forces generating main and circulating fluxes in a five branched magnetic path.

Considering one branch at a time, the main and circulating fluxes in region 44 adjacent aperture 37 are in the same direction and thus add, while in the branch 43, they are in an opposite direction and subtract. Thus, as between branches 44 and 43, branch 44 has the highest flux level, and if the relative cross-sections and path lengths leave the reluctance of branch 44 equal to branch 43, one may expect branch 44 to saturate first—should current in the main and primary control winding continue to increase. Similarly in respect to the regions adjacent aperture 36, the main and circulating fluxes add in region 40 and subtract in 41, leading to a greater flux in branch 40 than in 41. Should current in the main and primary control windings continue to increase, and if both regions are of equal path length and cross section, one would expect branch 40 to saturate before branch 41. Should all four branches (40, 41, 43, 44) be considered together, then due to the lesser cross-section of branch 44 (0.140×0.380) in respect to the cross-section of 40 (0.160×0.380), and assuming equality in the total flux in the two branches, one would expect the branch 44 to saturate in advance of the branch 40.

Figure 3B:
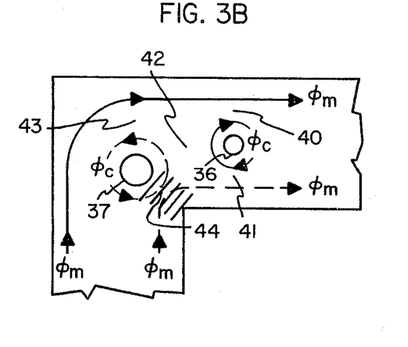

The dimensions of the apertures have been selected to insure the foregoing saturation sequence. FIG. 3B illustrates the second state with branch 44 saturated and symbolized by shading lines. The inner main flux inside the aperture pair is shown dashed to symbolize passage through a saturated branch tantamount to an air gap. The flux circulating about aperture 37 (now shown dashed) must now pass through a saturated branch also tantamount to an air gap. The magnetic coupling between primary and secondary control windings is substantially halved, since the left hand magnetic toroid encircling the control windings (19,20) as they pass down through the core is destroyed, leaving only the right hand magnetic toroid encircling the control windings (19,20) as they pass up through the core. Calculation also shows that the core reluctance coupling the primary to the secondary control winding, should increase by a factor of approximately two. This accounts for the initial decrease in the slope of the base current $i_b$ shown in FIG. 5.

Figure 3C:
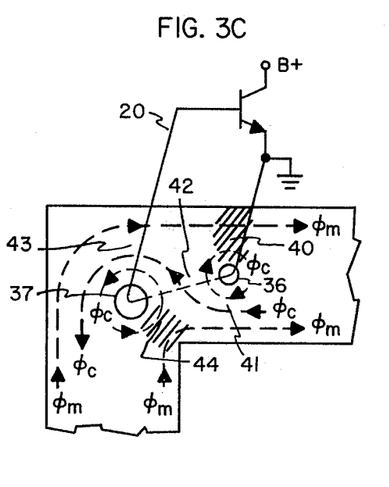
Figure 3D:
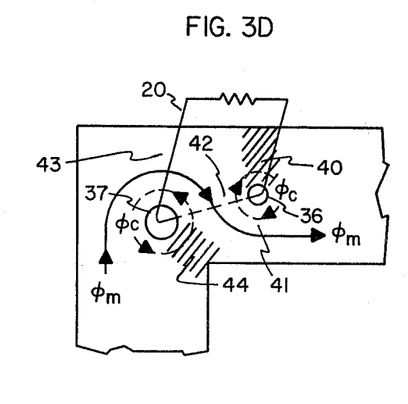

FIG. 3C illustrates the third state with shading lines symbolizing saturation of the second branch 40. Both main flux paths above and below the aperture pairs are shown dashed, implying passage through an air gap. The flux circulating about both apertures 37 and 36 are both dashed, since both portions must now pass through a saturated branch tantamount to an air gap. When branch 40 saturates, the right hand magnetic toroid encircling the control windings 19, 20, as they return upward through the core is also destroyed. Thus, the close magnetic coupling between primary and secondary winding (19, 20) is almost fully destroyed. Now all magnetic paths associated with windings 19, 20 have high reluctances. That is, two saturated paths exist, one around each aperture and a third longer path exists around the main core threading through branches 41, 42 and 43, including the two 0.020" air gaps between the core halves. Calculations show that these three paths are of high reluctance relative to the original double toroid by two orders of magnitude, typically. The reluctance increase accounts for the very sudden reversal in slope of the base drive current, $i_b$, (FIG. 5). The slope of the base drive continues downward through an inversion in the sense of the current drive ($i_b$), extracting stored charge from the transistor input junction and turning it off completely. The junction voltage remains positive (+0.7 volts) until the last of the stored charge is removed, and then goes strongly negative (as shown in FIG. 5) returning to near zero until the next trigger pulse causes conduction to start again.

Prior to a more analytical treatment of the foregoing drive reversal mechanism, a second drive reversal mechanism, which occurs with a non-energy storing load coupled to the control winding 20, will be described. Under these load conditions, saturation of branch 44 occurs first (as before) and incremental main flux is forced into branch 43. At this point the main flux increments may continue to flow through branch 40 with some diversion into the inter-aperture branch 42. As circulating flux and main flux continue to grow, branch 40 where the main flux and circulating flux add, now saturates. Saturation of branches 40 and 44 practically destroys current transformer action between 19 and 20 as before, also reducing any incremental growth in the circulating flux ($\phi_c$) in the inter-aperture branch 42 to a negligibly small value. The incremental main flux now substantially barred by saturation from entering branches 44 and 40, increases in branches 43 and 41, and passes strongly through the inter-aperture branch 42. The sense of the main flux in the branches 43, 42, 41 is opposed to that produced by the circulating flux, and since the main flux is larger, a strong conduction inhibiting voltage is applied to the secondary control winding 20. The foregoing mechanism applies if a large resistance is placed in series with the input junction of a transistor weakening the fixed $V_{be}$ voltage and energy storage constraints. The waveshape with either loading, however, exhibits as initially strong conduction aiding drive, a reduction in forward drive, followed by a strongly conduction inhibiting drive.

Figure 4A:
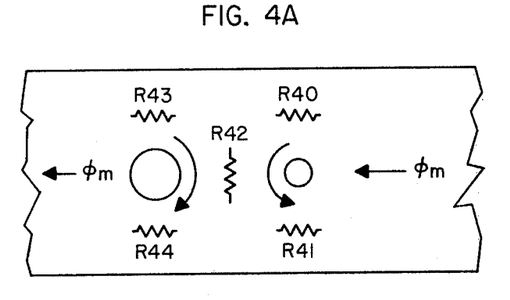
FIGS. 4A through 4C are schematic diagrams useful in a mathematical analysis of the transformer control function.
Figure 4B:
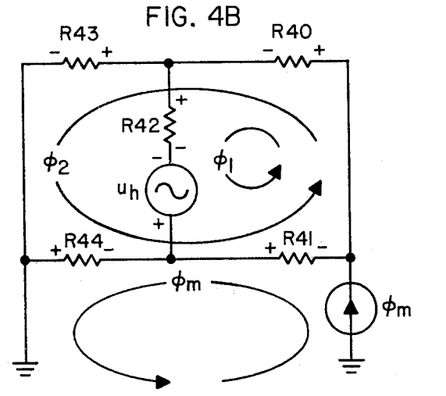

A more exact understanding of the operation of the invention may be achived by mathematical analysis. FIG. 4A illustrates a two aperture arrangement generally similar to that illustrated in FIG. 2 but differing in several respects. The aperture pair is illustrated disposed along the center line of a straight magnetic path, assumed to be part of a closed magnetic loop. The main flux is shown entering on the right hand side and exiting on the left hand side. The circulating fluxes associated with the apertures are shown rotating clockwise around the larger aperture and counterclockwise about the smaller aperture. Symbolic reluctances are shown positioned in each of the five branches 40–44 with subscripts assigned to designate each branch. In FIG. 4B the reluctances are interconnected into a magnetic equivalent circuit. For the analysis, three flux loops ($\phi_1$, $\phi_2$, $\phi_m$) have been defined. The first flux loop ($\phi_1$) embraces R40, R42, the generator $U_h$ and R41. $U_h$ is the magnetomotive force acting on the inter-aperture branch 42 provided by the primary control winding 19 and the secondary control winding 20. The second flux loop ($\phi_2$) embraces R40, R43, R44 and R41. The third loop ($\phi_m$) embraces the main flux generator $\phi_m$, R41 and R44. From inspection, the flux in the inter-aperture branch $\phi_{42}$ (now $\phi_1$) is defined by the following expression:

$$\phi_1 = \frac{U_h + \frac{(R41\ R43) - (R40\ R44)}{R40 + R41 + R43 + R44} \phi_m}{R42 + \frac{(R40 + R41)(R43 + R44)}{R40 + R41 + R43 + R44}} \quad (1)$$

The coefficient of the numerator term "$\phi_m$" may be symbolized by "$\Delta_N$":

$$\Delta_N = \frac{(R41\ R43) - (R40\ R44)}{R40 + R41 + R43 + R44} \quad (2)$$

The denominator may be symbolized as "$\Delta_D$";

$$\Delta_D = R42 + \frac{(R40 + R41)(R43 + R44)}{R40 + R41 + R43 + R44} \quad (3)$$

Assuming linear reluctances before saturation and symmetry in aperture placement by which R41 R43 = R40 R44, the numerator term $\Delta_n$ becomes zero. Thus, prior to saturation, $\phi_1$ is independent of main flux to the extent that $\Delta_N$ approaches zero.

The virtual generator resulting from current flow in the control windings 19 and 20 produces a magnetomotive force $U_h$:

$$U_h = N_c i_c - N_b i_b \quad (4)$$

Expression 4 is a consequence of Ampere's law and Lenz' law, the latter law implying that induced current flowing in the secondary winding $N_b$ (winding 20) generates a magnetomotive force opposing the primary current flowing in the primary winding $N_c$ (winding 19).

Figure 4C:
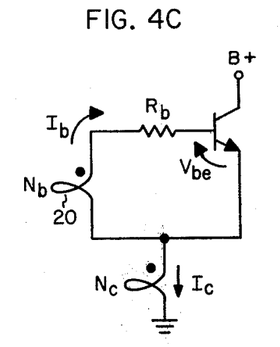

Continuing the analysis, the simplified electrical circuit involving the primary winding $N_c$ (winding 19) and the secondary winding $N_b$ (winding 20) are illustrated in FIG. 4C. A transistor is illustrated in this figure, having its collector coupled to a suitable source of B+ potentials, its base led through an external resistance $R_b$ and the secondary winding $N_b$ to its emitter. The emitter is then connected through the primary winding $N_c$ to ground. An arrow indicating the base current ($i_b$) is shown flowing through the winding $N_b$ and the resistance $R_b$ toward the base. The collector current $i_c$ is shown flowing through the winding $N_c$ to ground. A voltage $V_{be}$ is indicated between the base and emitter electrodes. The quantity $V_{be}$ is assumed to be constant in the transistor in the forward biased direction and to remain constant until all stored charge is removed.

By Faraday's law, the voltage induced in the secondary winding must equal the voltage drop in the external base circuit:

$$N_b \dot\phi_1 = i_b R_b + V_{be} \quad (5)$$

The quantity $R_b$ is normally kept quite small and is zero in the present practical circuit.

As a further simplification in the analysis, the main flux ($\phi_m$) and collector current ($i_c$) are assumed to be a linear function of time:

$$\phi_m = \frac{L_p i_c}{N_p} = \frac{B+}{N_p} t \quad (6)$$

Where $L_p$ is the inductance of the primary winding and $N_p$ are the turns in the primary winding. These assumptions are consistent with observed collector current waveforms. Combining the previous equations, a differential equation may be written which specifies the flux ($\phi_1$) in the inter-aperture branch.

$$\left(\frac{N_b^2}{R_b \Delta_D}\right) \dot\phi_1 + \phi_1 = \left(\frac{N_b V_{be}}{R_b \Delta_D}\right) + \left(\frac{N_c B+}{\Delta_D L_p} + \frac{B+ \Delta_N}{N_p \Delta_D}\right) t \quad (7)$$

When this expression is solved by use of the La Place transformation, the following expression is obtained:

$$\phi_1(t) = \left[\frac{N_c B+}{L_p \Delta_D} + \frac{\Delta_N B+}{N_p \Delta_D}\right] \left[\frac{N_b+}{R_b \Delta_D}\right]$$
$$\left[e^{-t/\frac{N_b^2}{R_b \Delta_D}} + \frac{t}{\frac{N_b^2}{R_b \Delta_D}} - 1\right] +$$
$$\left[\frac{N_b V_{be}}{R_b \Delta_D}\right]\left[1 - e^{-t\frac{N_b^2}{R_b \Delta_D}}\right] \quad (8)$$

Using expressions 1 and 4 and solving for $i_b$:

$$i_b = \frac{N_c i_c}{N_b} + \frac{\phi_m \Delta_N}{N_b} - \frac{\Delta_D \phi_1}{N_b} \quad (9)$$

Using expression 6 to eliminate $\phi_m$:

$$i_b = i_c \left[\frac{N_c}{N_b} = \frac{L_p \Delta_N}{N_p N_b}\right] - \frac{\Delta_D \phi_1}{N_b} \quad (10)$$

Assuming from (6) that $i_c(t) = B+/L_p\, t$, i.e. a linear (11) function of time throughout the conduction period, $i_c$ may be eliminated:

$$i_b = \left[\frac{B+ N_c}{L_p N_b} + \frac{B+ \Delta_N}{N_p N_b}\right] t - \phi_1 \frac{\Delta_D}{N_b} \quad (12)$$

Substituting for $\phi_1$ from expression 8 and simplifying we obtain:

$$i_b = \left[\frac{N_c B+ N_b}{L_p \Delta_D R_b} + \frac{N_b B+ N}{N_p \Delta_D R_b} - \frac{V_{be}}{R_b}\right]\left[1 - e^{-t/\frac{N_b^2}{R_b \Delta_D}}\right] \quad (13)$$

Assuming that the base time constant ($N_b^2/R_b \Delta_D$) is several times larger than the time constant required to saturate the ferrite and establish transistor turn off, expression 13 can be further simplified:

$$i_b \cong \left[\frac{N_c B+}{N_b L_p} + \frac{B+ \Delta_N}{N_p N_b} - \frac{V_{be} \Delta_D}{N_b^2}\right] t \quad (14)$$

The terms of expression 14 have several implications. The bracketed quantity is multiplied by the quantity t, making it clear that $i_b$ is a time dependent quantity. The first term in the bracket corresponds to the current transformer and signifies the contribution to $i_b$ resulting from the windings 19 and 20, the B+ potential and the inductance of the main primary winding. The second term of expression 14 contains the numerator term $\Delta_N$, which is initially zero, assuming geometrical symmetry and nonsaturation. The last term is a virtual current generator term reflecting the presence of the transistor junction. The second term will take the non-zero values when saturation of branches 40, 44 occur and will serve to reverse the base drive since the quantity $\Delta_N$ will assume large negative values.

Expressed mathematically, a neutral flux disposition is achieved by placing the large aperture 37 and the small aperture 36 along the practical center line of the leg, so that the reluctances in the branches above and below each aperture are alike, while the reluctances associated with the larger aperture are larger than the reluctances associated with the smaller aperture. The equations support the more general concept that the diagonal products of the reluctances should be equal ($R41 \times R43 = R40 \times R44$). This implies that there is no immediate loss in isolation if the apertures are displaced from the center line, so long as the centers of the apertures are held parallel to the center line. The core material is not perfectly linear, and tends to imbalance the relationship as the offset increases, however. The reluctance of the outer and inner paths is altered, at the corners attributable in part to the greater length of the outer path than the inner path. The flux will tend not to enter the outer corner and individual lines of flux will turn with an appreciable radius. The composite effect is to bring the aperture at the corner in slightly for neutrality assuming a rectangular inner and a rectangular outer corner. In general, where minimum core weights are sought and practical low cost core materials must be used, the preference is to place the apertures so that the reluctances at each aperture are approximately equal. The aperture separation should normally exceed that in the lateral branches to avoid saturation in the center region which also tends to make core material usage inefficient. In the practical application herein described, saturation in the center is normally avoided by a small excess in cross section (e.g. 0.19 vs 0.16 vs 0.14). The aperture separation should normally be less than two times the width of the core (0.38 in the present case) since this permits two complete minimum reluctance toroids to be erected around each aperture. For greater separations between apertures, the neutrality of the control winding to main flux levels suffers.

Figure 6:
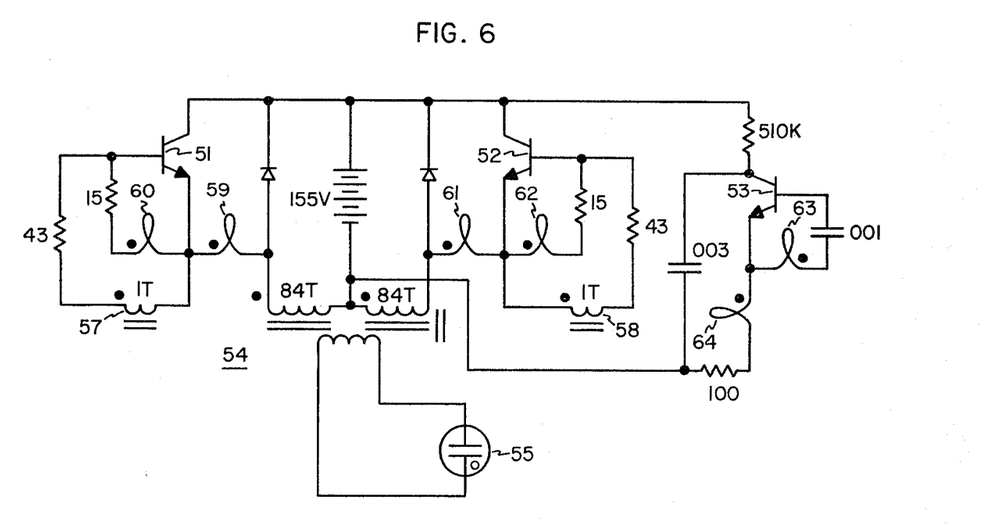
FIG. 6 is an electrical diagram of an inverter employing two alternately conducting transistors.

While the double aperture configuration has been employed in an inverter using a single transistor, it may also be employed in an inverter employing two alternately conducting transistors as shown in FIG. 6.

In FIG. 6 the transistors 51 and 52 are the main switching transistors, and the transistor 53 is a starting transistor. The power transformer 54 has a center tapped primary winding and a main secondary winding coupled to the load illustrated as a gas discharge lamp 55. The core of transformer 54 is shunted as illustrated in Figure, and has two pairs of double apertures, one pair in the upper right side of the core and the other pair in the lower right side of the core using the orientations of FIG. 2. The transformer has a pair of voltage feedback windings 57 and 58 each connected in series with a small resistance across the input junctions of the switching transistors. Current feedback winding pairs 59, 60 and 61, 62 associated with double apertures are also provided. The primary windings of the current feedback windings are connected in series with the respective halves of the center tapped transformer primary and the emitters of the associated power transistors. This connection forces the primary current to pass through the current feedback windings 59 and 61. The second current feedback windings 60 and 62, which are inductively coupled to the control windings 59 and 61, respectively, are each connected with a serial resistance between the emitters and bases of the respective switching transistors. Once oscillation is instituted, the voltage and current feedback produce an alternating switching sequence, and the base current drive applied to the individual switching transistors is initially conduction aiding and then conduction inhibiting as before.

The FIG. 6 circuit commences to oscillate following a starting pulse generated by a circuit consisting of transistor 53, associated resistors and capacitors and windings 63 and 64 associated with one aperture pair. The starting pulse appears in winding 64 and is coupled to the current feedback winding in the same aperture pair. The appropriate switching transistors (51 or 52) begins to conduct as a result. Selective saturation of the magnetic domains (as previously detailed) determines the length of the conduction interval. The turn-off induces an equal magnitude current, but in the opposite direction in the other half of the primary. This current is conducted partially by the flyback diodes, each shown connected between an outer primary terminal and the collector of one of the switching transistors. The remaining oppositely directed current serves to inject charge into the base and results in base to collector reverse conduction. The base potential soon falls below that of the collector, and the transistor conducts normally, setting up the conditions for repeated alternate conductions. During each conduction period, base current is provided via current feedback to insure transistor saturation. For certain loads (resistive loads), commutation conditions are insured without the use of flyback diodes. The reactive current for these loads may be carried without harm by the collector-base junctions.

The voltage feedback provided by winding 57 and 58 is to insure the operation of the inverter under no load conditions. It is possible to provide no load operation by other means such as a large magnetizing current but voltage feedback is preferable since it keeps the current in the transistor to a minimum. The illustrated circuit is suitable for use with a number of loads including fluorescent lights. If used with a gaseous discharge light source, means for supplying a high voltage starting voltage should be provided.

Both the one transistor and the two transistor inverter power circuits which have been described exhibit excellent efficiencies. Known inverters operate with 6 to 8 percent losses. With the use of the two aperture core configurations in which drive is optimized, the system losses are typically reduced a further 1 to 3 percent. Since the transistor losses contribute about one third to the net system losses, the reduction in transistor losses may be in excess of 50%, greatly reducing the internal dissipation.

The transistor control mechanism of the present novel transformer permits lower total circuit dissipation than certain of the cited magnetic state responsive circuits. When a transistor input junction becomes the load to the control winding in the present double aperture configuration, the input junction may be directly coupled across the control winding without the addition of a series voltage dropping resistance to protect the input junction during turn-off and establish the reverse current level.

A resistance for junction protection with its attendant losses is not required in circuits coupled to the present transformer. In both the conduction aiding and conducting inhibiting modes of operation and until the transistor switch is turned off, the virtual electric generator acting through the second control winding 20 (FIG. 1) remains a current source not capable of generating a stiff inverse voltage across the transistor input junction. After the first branch (44) has saturated, which reduces the forward drive, the second control winding continues to maintain current transformer action. In this state, coupling of the control winding 20 to the primary control winding continues even though reduced and coupling of the control winding to the main flux is affected by the presence of two alternate paths for the main flux. One flux path (40) is not substantially coupled to the second control winding and one path (42) is. The uncoupled path (40) shunts the other path (42) and provides an alternate low reluctance path so that main flux is not forced into branch 42 and the "stiff" voltage transformer action mentioned earlier is avoided. In addition, the flux in branch 42 remains load responsive, being affected by the presence of the input junction, which acting as a generator substains the existent rate of change in flux in the branch and resists entry of the reversely sensed main flux. Since the ferrite in branch 40 has some residual slope in its B/H characteristic, the load impedance presented to the input junction continues to remain large in relation to the small internal resistance of the junction. In consequence, the alternate flux path presented by branch 40 remains available to (and favored for) the main flux and the transformer retains its nature as a current source until the negative drive has removed all stored charge from the transistor input junction, and it is off. With the transistor off, entry of the main flux into branch 42 is no longer resisted. The main flux may now enter branch 42 and does produce inverse voltage at negligible current across the input junction. Had the "virtual electric generator" become a voltage source before transistor turn off, then a series resistor developing several volts and increasing the circuit dissipation several times over that of the actual base junction losses would have been required to protect the transistor during turn-off. Thus, additional power is saved by the present circuit beyond that attributable to efficient operation of the transistor switch alone.

While the invention is applicable to a variety of ferrite materials, the materials classified as "soft" ferrites are most satisfactory. A suitable material in this class is the Stackpole material 24B. The material has a steeper slope and substantial curvature at lower "B" values, but as B increases, both a curvature remains and an absolute slope remains, though reduced. This property facilitates the function of the transistor input junction in sustaining current generator action and precluding premature voltage generator action. As the second branch 40 is saturating under the growing main flux, by which is meant a continuing reduction in slope of the B/H characteristic is taking place, the two reluctance dependent terms of expression 14 (defining the base current drive) become increasingly negative. This suggests that at some point on the slope of the B/H characteristic, the base drive will become zero, and that beyond this point, the base drive will become negative in correspondence to observation. To achieve an initial regenerative action, a certain slope of the B/H curve is assumed in expression 14. For the final degenerative action, the slope must change enough to increase the two reluctance dependent terms to the point where the full expression becomes negative corresponding to a reversal in drive. The desired change in drive from regenerative to degenerative may therefore take place without precise dependence on the manner in which the B/H curve goes from a steeper slope to a less steep slope. However, as noted earlier, the desired current transformer action is facilitated by the assumption that the B/H curve still retains appreciable slope and so does not present a zero load to the transistor input junction during the interval that it itself is a source of energy. Observation of the constancy of the $V_{eb}$ voltage shows that soft ferrites generally have the required B/H properties necessary for safe and efficient turn off of conventional junction type power transistors.

In high efficiency circuits, a damping resistor (35, FIG. 1) is generally used to damp any ringing which might occur during switching and prevent accidental retriggering of the transistor. The resistor, which is connected in shunt across the base junction, prevents high frequency energy coupled through the collector-base capacity to the base electrode from causing injection. The resistor can be chosen so that the dissipation is small compared to the base junction dissipation and preserves circuit efficiency.

Transformer-transistor circuits of the nature herein contemplated have an improved stability of power versus temperature. This is true in both triggered and self-oscillating configurations. Both the junction transistor and the ferrite of the core are exposed to the same temperature in conventional packaging. This intimacy is a consequence of the desirability to achieve a minimum size total package and is in part due to the requirement to reduce electro-magnetic interference which increases as lead lengths and component separations increase. With increasing temperature, the "B max" of the ferrite decreases, reducing the volt time area of individual conduction periods. Thus, with increasing temperature and fixed supply voltage, the ferrite action tends to decrease the individual conduction periods. The voltage into which the control winding operates is a diode junction whose voltage decreases with temperature, which tends to increase the individual conduction periods. These two effects are approximately in a ratio of 3 to 2 with the effect of the ferrite dominating, and producing a 3 to 1 improvement in power stability.

While the transformer herein described has been illustrated in use in two kinds of static inverters, it is also applicable to blocking oscillators and other forms of static inverters.

What is claimed as new and desired to be secured by Letters Patent of the United States is:

1. A transformer having
   (1) a core of substantially linear magnetic material for main flux pursuing a closed magnetic path, a pair of apertures in a localized region of the core, a first aperture being arranged before a second aperture along said magnetic path, said first aperture dividing the magnetic path into a first and a second branch, and said second aperture dividing the magnetic path into a third and fourth branch, with a fifth branch being formed between said apertures, the first and fourth branches forming a first diagonal pair of branches and the second and third branches forming a second diagonal pair of branches,
   (2) a primary winding encircling said magnetic core for generating a main flux in said closed magnetic path when a voltage is applied thereto,
   (3) a first control winding, serially coupled with said primary winding, encircling said fifth branch for generating a circulating flux forming two counter-rotating loops, one around each aperture, when current is supplied thereto, the fluxes in said two loops combining additively in said fifth branch, the flux in one of the loops combining with said main flux additively in each of said first diagonal pair of branches, and substractively in each of said second diagonal pair of branches, predisposing a branch in said first diagonal pair of saturate first as energization increases, and
   (4) a second control winding encircling said fifth branch for deriving an electrical quantity whose sign reverses as a function of the magnetic state of said core.

2. A transformer as in claim 1 wherein
   said apertures are serially arranged along said magnetic path placing said fifth branch orthogonal to said main flux to reduce the tendency of main flux to flow into said fifth branch and to be coupled to said second control winding.

3. A transformer as set forth in claim 1 wherein
the product of the reluctances of said first diagonal pair of branches equals the product of the reluctances of said second diagonal pair of branches to reduce the tendency of main flux to be coupled to said second control winding.

4. A transformer as set forth in claim 3 wherein
the reluctances of said first and second branch are equal and the reluctances of said third and fourth branches are equal.

5. A transformer as set forth in claim 3 wherein
the reluctances of said first and second branches are equal and the reluctances of said third and fourth branches are equal and larger than the reluctances of said first and second branches, predisposing said fourth branch in said first diagonal pair to saturate first.

6. A transformer as set forth in claim 5 wherein
said first aperture is of lesser diameter than said second aperture.

7. A transformer as set forth in claim 6 wherein
the reluctance of said fifth branch is less than that of said other branches to preclude saturation thereof prior to said first and fourth branches.

8. A transformer as set forth in claim 2 wherein
said first and second control windings are of a few turns and are closely coupled in the absence of selective saturation to achieve substantial current transformer action.

9. A transformer as set forth in claim 8 wherein
said first control winding has maximum core coupling to said second control winding in the absence of saturation, said coupling being reduced as each branch saturates.

10. In combination,
(1) a core of substantially linear magnetic material for main flux pursing a closed magnetic path, a pair of apertures in a localized region of the core, a first aperture being arranged before a second aperture along said magnetic path, said first aperture dividing the magnetic path into a first and second branch, and the second aperture dividing the magnetic path into a third and fourth branch, with a fifth branch being formed between said apertures, the first and fourth branches forming a first diagonal pair of branches and the second and third branches forming a second diagonal pair of branches,
(2) a primary winding encircling said magnetic core for generating a main flux in said closed magnetic path when an alternating voltage is applied thereto,
(3) a first control winding encircling said fifth branch for generating a circulating flux forming two counterrotating loops, one around each aperture, when an alternating current is supplied thereto, the flux in said two loops combining additively in said fifth branch,
(4) means for energizing said primary winding and said first control winding with alternating quantities having a fixed relative phase so that the flux in one of the loops combines with said main flux additively in each of said first diagonal pair of branches and subtractively in each of said second diagonal pair of branches, predisposing a branch in said first diagonal pair to saturate first as the energization increases, said energization being increased until saturation is approached, and
(5) a second control winding encircling said fifth branch for deriving an electrical quantity whose sign reverses as a function of the magnetic state of said core.

11. The combination as set forth in claim 10
having in addition thereto a resistive load coupled to said second control winding,
saturation of said first diagonal pair of branches tending to force main flux into said fifth region and reverse the polarity of the electrical quantity coupled to said resistive load.

12. In combination with a transformer as in claim 10,
a junction transistor switching device for applying alternating current to said primary winding and to said first control winding, said device exhibiting appreciable stored charge, and
means coupling said second control winding across the input junction of said transistor for applying a current to said switching device in a sense aiding normal conduction in the absence of saturation, and in a sense inhibiting transistor conduction when saturation occurs.

13. The combination set forth in claim 12 wherein
said transformer core material has a B max which decreases with increasing temperature tending to reduce the volt time area of each conduction period while the voltage of the transistor input junction to which the transformer control winding is connected decreases with increasing temperature so as to increase each conduction period, said connection reducing the effect of temperature upon the output power.

14. The combination set forth in claim 12 wherein
said coupling means couples said second control winding directly across said input junction to provide a serial path of low resistance to reduce circuit dissipation, said second control winding not appearing as a voltage source until said transistor is substantially non-conductive.

15. The combination set forth in claim 14 wherein
the reluctances of said first and second branches are substantially equal and the reluctances of said third and fourth branches are equal,
said input junction sustaining a constant voltage drop across said second control winding and forcing a constant rate of change of flux in said fifth branch so long as said transistor is conductive, saturation of said first diagonal pair of branches increasing the reluctance coupling said second control winding to said first control winding and causing a reversal in polarity of said applied current until stored charge is removed from said switching device and conduction is terminated.

16. The combination set forth in claim 14 wherein
the reluctances of said first and second branches are equal and the reluctances of said third and fourth branches are equal and larger than the reluctances of said first and second branches, predisposing said fourth branch to saturate first and said first branch to saturate second, saturation of said fourth branch increasing the reluctance coupling said second control winding to said first control winding and reducing the rate of increase of applied current; saturation of said first branch causing a reversal in slope of said applied current and a reversal in current, said reversals continuing until stored charge is removed from said switching device and conduction terminated.

17. A transformer having
(1) a core of substantially linear magnetic material having a closed magnetic path, a first pair of apertures in the core in a first localized region of the core, and a second aperture pair in a second localized region of the core,
   one aperture of each said pair dividing the magnetic path into a first and a second branch and the other aperture of that pair dividing the magnetic path into a third and fourth branch, with a fifth branch being formed between said apertures, the first and fourth branches forming a first diagonal pair of branches and the second and third branches forming a second diagonal pair of branches to form a set of five branches in each region,
(2) a pair of primary windings encircling the magnetic path for generating a main flux in said core when current is supplied thereto,
(3) a pair of first control windings each encircling the fifth branch of each region for generating a circulating flux forming two counterrotating loops around said apertures when current is supplied thereto, the fluxes in said two loops combining additively in said fifth branch, the flux in one of the loops combining with said main flux additively in each of one diagonal pair of branches and subtractively in each of the other diagonal pair of branches, predisposing a branch in said first diagonal pair of saturate first as energization increases,
(4) a pair of second control windings, each encircling the fifth branch of said region for deriving an electrical quantity whose sign reverses as a function of the magnetic state of said core.

18. A transformer as in claim 17 wherein
the apertures of each pair are serially arranged along said magnetic path, placing said fifth branch orthogonal to said main flux to reduce the tendency of the main flux to flow into said fifth branch and to be coupled to said second control winding.

* * * * *